United States Patent [19]
Claxton et al.

[11] 3,873,305
[45] Mar. 25, 1975

[54] METHOD OF MELTING PARTICULATE METAL CHARGE

[75] Inventors: Raymond J. Claxton, Fox Chapel; Russell J. Logan, Sewickley; Charles E. West, Lower Burrell, all of Pa.

[73] Assignee: Aluminum Company of America, Pittsburgh, Pa.

[22] Filed: Apr. 8, 1974

[21] Appl. No.: 458,552

[52] U.S. Cl. .............................. 75/68 R, 266/33 S
[51] Int. Cl. ............................................. C22b 21/06
[58] Field of Search ......... 75/65 R, 68 R; 266/33 R, 266/33 S

[56] References Cited
UNITED STATES PATENTS

| | | | |
|---|---|---|---|
| 1,522,765 | 1/1925 | Wilke | 266/33 S |
| 1,630,361 | 5/1927 | Stay et al. | 266/33 R |
| 2,426,389 | 8/1947 | Chew | 266/33 R |
| 2,793,852 | 5/1957 | Harrison | 266/33 R |
| 3,094,411 | 6/1963 | Triffleman | 75/65 R |
| 3,767,382 | 10/1973 | Bruno et al. | 75/68 R |
| 3,813,238 | 5/1974 | Salmon et al. | 75/68 R |

*Primary Examiner*—L. Dewayne Rutledge
*Assistant Examiner*—M. J. Andrews
*Attorney, Agent, or Firm*—Carl R. Lippert

[57] ABSTRACT

Recycled aluminum containers and other charges of aluminum or other metals comprising pieces and particles are rapidly melted by forced submergence in a moving stream or system of molten melting media. For melting aluminum the media can be molten aluminum or a molten salt. The charge is forcibly submerged by the action of a rotating wedge blade situated within a downwardly diverging conduit.

24 Claims, 4 Drawing Figures a b c d

METHOD OF MELTING PARTICULATE METAL CHARGE

BACKGROUND OF THE INVENTION

This invention relates to a method for reclaiming used aluminum containers and in particular provides a method by which used aluminum containers may be rapidly and continuously melted by submergence in molten aluminum with minimal formation of aluminum oxide.

In view of the obvious need to conserve resources and provide a cleaner environment, considerable effort has been expended to recycle used materials economically, particularly in the metals industry with respect to reclaiming used metal containers such as cans used for foods or beverages and the like.

Various methods are disclosed in the art as to recycling of metal or scrap in order to recover metal values therefrom. Generally, these methods include melting the metal either by heating it directly or by immersing it in a body of molten metal or salt. The latter method of heating is preferable because melting by direct heating of solid metal by combustion gases provides for inefficient heat transfer and substantial oxidation rates and hence metal lost through oxidation in melting, referred to as melt loss. When the molten metal immersion approach is used, preferably the molten metal moves in a recirculating pattern which offers substantial advantages over a stagnant pool and its inherent limitations in capacity, heat transfer efficiency and temperature control. Accordingly, a desirable melting practice contemplates a circulatory molten metal system with separate heating and charging stations which offers the advantages of large capacity and reduced melt loss because of superior heat transfer and better temperature control.

Skim formation is an inherent problem in any method of melting as readily oxidizable metal such as aluminum, especially aluminum base alloys containing magnesium. The skim referred to is the metal oxide which not only consumes the metal oxidized, but the oxide skim, in rising from the metal melt to form a floating skim layer, entrains substantial amounts of unoxidized metal which adds to the total melt loss. The circulatory melting systems referred to above are especially sensitive to skim formation since the floating skim, an insulator, substantially reduces the ability to heat the molten metal through its surface. The reduced heat input to the molten metal obviously reduces the melting capacity of a circulatory system and, in addition, equipment life tends to be shortened by absorbing heat rejected by the insulative oxide skim.

Where the solid charge is in the form of reclaimed cans certain problems are presented which seriously interfere with melting. First, the charge lacks sufficient density to submerge itself by gravity and hence must be forcibly immersed in the molten aluminum melting media. Second, unlike other forms of low density charge such as lathe turnings, chips, particles, and the like which are readily flowable and hence readily delivered and immersed by mechanical arrangements known for the purpose, can scrap, while flowable, is not as readily flowable and hence not as readily delivered and immersed using the conventional arrangements. The can scrap charge ranging from very small bits and pieces up to complete crushed cans, and including shreds and jagged edges, simply clogs or bridges a conventional charging arrangement such as a screw conveyor. This, in turn, seriously impedes a circulatory melting system by reducing capacity and disrupting temperature control. Also there is an inherent lack of smoothness or continuity which aggravates the skim problem. One mode of introduction which avoids the problem of jamming experienced with the mechanical delivery systems is the use of hydraulic force whereby a falling stream of molten metal impinges upon the charge as it is delivered and thus causes it to be submerged. This initially enables improved rates of charge introduction and continuity, but produces very high amounts of skim which, in addition to the melt loss occasioned thereby, drastically interferes with a circulatory melting system as explained above thus seriously depleting the gains initially achieved. The use of an inert atmosphere does not sufficiently improve the situation since the open nature of the charge tends to carry with it large amounts of air whereas even small amounts of air suffice to present a serious problem and attempts to seal off air from entering also tend to clog the charge introduction. Similar results are encountered in employing a vortex system wherein the molten aluminum melting media is swirled in a whirlpool and the charge ingested by the swirling action. The required tangential velocity to produce a vortex effect sufficient for commercial charge rates is so high that very high turbulence and skim formation are practically unavoidable.

SUMMARY OF THE INVENTION

In accordance with the present invention aluminum can scrap or other metal charge comprising bits and pieces is rapidly melted in a highly efficient manner both from the standpoint of maximum heat utilization and minimum melt loss in a relatively uncomplicated and trouble-free system. Moreover the system is readily capable of handling very high rates of charge without impairing the high efficiencies. Basically the system consists of a selectively designed rotating wedge surface or pitched blade situated inside a downwardly diverging conduit discharging into a moving melt. The blade describes an included arc of less than 360° and the conduit preferably discharges into a moving body of superheated melting media. This system has the advantages of a mechanical system with respect to minimal skim generation but is not marked by the deficiencies of known mechanical systems in handling can scrap type charges.

FIGURES

In the description below reference is made to the following drawings in which.

Figure 3:
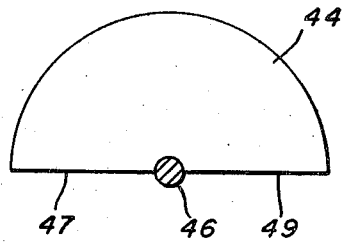
FIG. 3 is a plan view taken along line III—III in FIG. 2.
Figure 4:
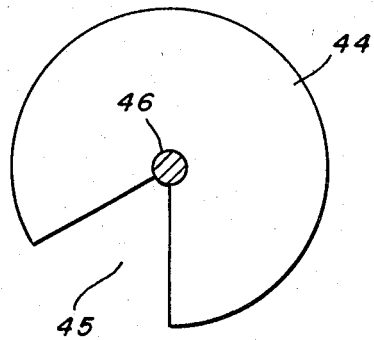
Figure 4:
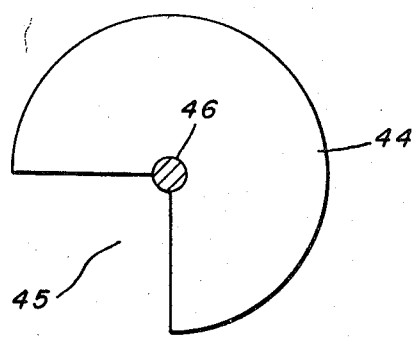
Figure 4:
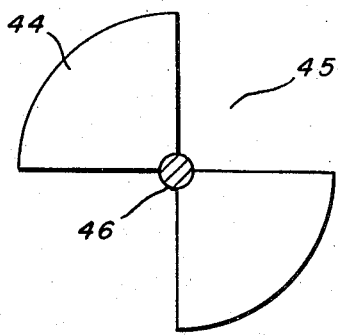
Figure 4:
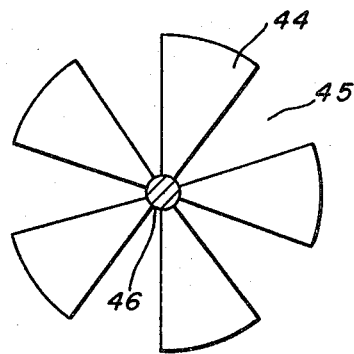

FIG. 4, a through d, are plan views of alternative arrangements to that shown in FIG. 3.

DETAILED DESCRIPTION

Figure 1:
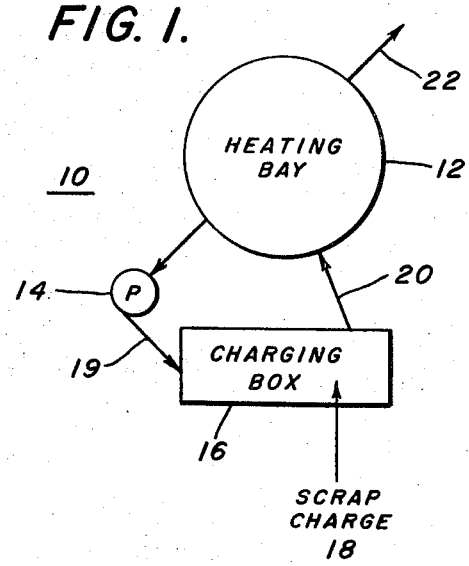
FIG. 1 is a plan view showing a general schematic of a circulatory metal melting system.

FIG. 1 is a schematic of a circulatory metal melting system 10 wherein molten metal or other melting media is recirculated from the heating station 12 through pump 14 and line 19 to the charging station 16, where a scrap feed 18 is introduced, and then returned via line 20 to the heating station. The molten melting media is heated in the heating station as by combustion units discharging their heat upon the upper surface of the liquid media in the bay. A product discharge line 22 exiting from the heating station 12 removes molten metal at a rate commensurate with the charging rate to the charging station. This is the type of arrangement described generally above as the circulatory system and which offers the high efficiencies with respect to heat utilization, melting rate and low skim generation but which encounters difficulty in connection with the use of can scrap as a charge. The system as shown in FIG. 1 is for operation with molten metal of similar composition to the charge such that the composition is controlled at all times. If molten salt (or some other substance) were employed as the melting media, a salt-metal separation would have to occur, usually by gravity with the molten metal settling, to facilitate removal of the melted charge.

In the heating chamber 12 the melting media is heated to a temperature significantly above the melting temperature of the scrap charge so as to, by depletion of sensible heat therefrom, provide the latent heat necessary to melt the charge. This can be referred to as superheating, that is, heating substantially above melting temperature such that substantial heat can be removed without solidification. When the molten media is aluminum, a suitable temperature leaving the heating bay is around 1,400° to 1,500°F although, as temperatures exceed 1,475°F there is a greater tendency to form oxide in the heating bay and hence temperatures are preferably kept below 1,475°F. The temperature of the molten aluminum exiting the charging bay and entering the heating bay is preferably around 1,250° to 1,375°F although as the temperature is allowed to drop below 1,300°F the heat content of the system approaches solidification which can cause problems. The rate of molten melting media, especially where it is aluminum, amounts to about 10 to 50 times the rate of charge introduction on a weight basis with 15 to 25 times the charge rate being quite suitable. A typical temperature exiting the heating bay might be 1,400°F and a typical temperature exiting the charging bay in line 20 might be 1,300°F, and a typical rate of flow of molten aluminum recirculated can be around 20 pounds for each pound of scrap feed melt. This type of system, as explained earlier, provides for very high efficiencies in heat utilization and melting rates provided skim is kept to a minimum. However, as also explained above, the particular characteristics of can scrap presents serious charging problems which either cause the development of excessive skim or retard charging rates or even bring the rate to a complete stop or produce both effects.

Figure 2:
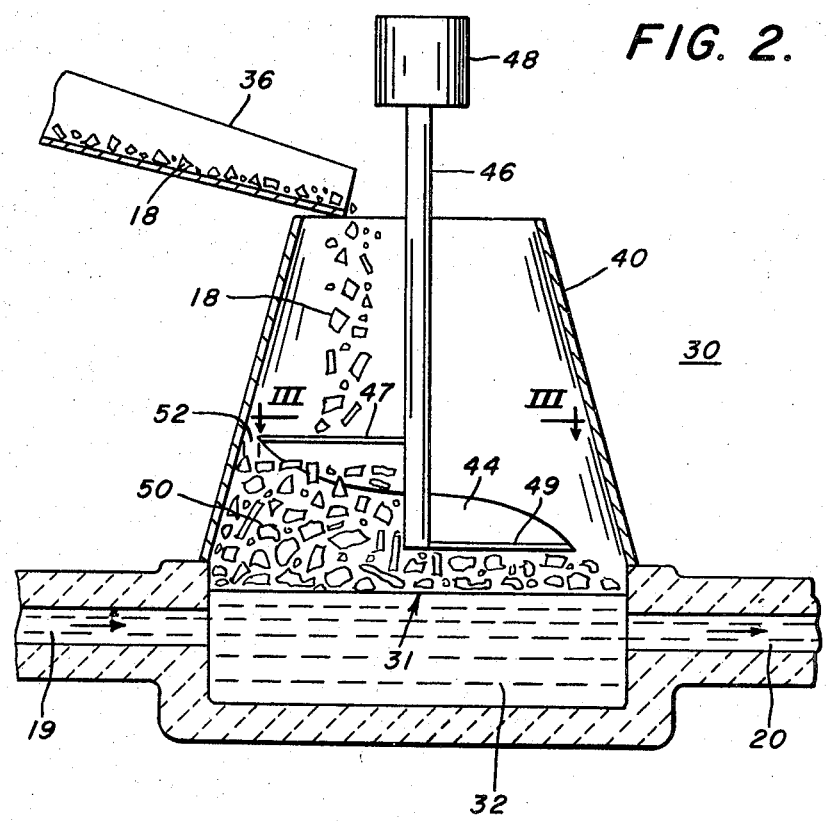
FIG. 2 is an elevation view, in cross section, illustrating the improved feed system.

Referring to FIG. 2 there is shown an embodiment of the improved feed system wherein the feed system 30 comprises a melting zone 32 which can replace the charging bay 16 in the circulatory system shown in FIG. 1. The scrap charge 18 is fed through conveyor trough 36 to the top of a downwardly diverging conduit 40 which discharges into the melting zone or chamber 32. Molten metal is supplied to the melting chamber 32 through inlet 19 and exits through outlet 20 through which it can return to the heating bay when a circulatory system is employed. Within the downwardly diverging conduit 40 is situated the rotary wedge or pitch blade 44 rotated by shaft 46 driven by driving means 48, suitably an electric motor. The charge 18 falls from the outlet of feed trough 36 and into the zone of the blade 44 where it is pressed downwardly to provide a more or less compacted, or at least downwardly pressed, mass 50 of charge scrap beneath the blade, which mass is continuously depleted from below by the passage of the molten metal through charging chamber 32 and is continuously replenished from above by the action of the rotary blade or wedge surface 44 acting on further supply of the charge.

It is important in practicing the invention that the rotary wedge or pitched blade 44 describe an included angle or sector that is less than 360° or that it not substantially exceed 360° and include an opening therein so as to provide an open path to facilitate passage of the scrap feed directly by gravity through the zone of the wedge or blade 44. Referring to FIG. 3 the blade for the system shown in FIG. 2 describes a sector of 180° and this has been found to work quite satisfactorily. Also the invention contemplates other blade configurations. Referring to FIG. 4, examples of suitable blade configurations are shown although this selection is not all inclusive. Referring to FIG. 4a, there is shown a blade 44 describing a sector somewhat larger than 270° which leaves an opening 45 of somewhat less than 90°. In FIG. 4b the blade sector is 270° and the opening 45 is 90°. In FIG. 4c, two 90° blades are shown which leave two openings 45 of 90° each. In FIG. 4d there is shown a five-blade arrangement with each blade 44 and each space 45 between the blades describing an arc of 36°. Other arrangements are satisfactory and will present themselves to those skilled in the art based on the guidelines herein set forth. What is essential is that the rotary wedge or pitched blade be provided with openings such that the blade, when not rotating, does not describe a closed 360° circle so as to leave openings of substantial size, the smallest dimension of the area of an opening being at least 4 inches, preferably at least 6 inches, to assure that can scrap pieces can pass by gravity through the opening. The openings can conveniently be provided by a single or several blades which together describe an arc of less than 360°, and preferably less than 270° with very high levels of performance being achieved when the blades cover approximately 180°, that is between 160° and 200°, or at least do not exceed 180°. This provides for openings which constitute 25 to 60 percent of the area of a complete circle described by the travel or sweep of the rotary wedge or pitch blade.

The pitch of the blade or the vertical distance swept by the blade, i.e., the vertical distance between the leading edge 47 and the trailing edge 49, should be substantial so as to facilitate a substantial amount of pressing or compaction of the mass beneath the blade for each rotation thereof thus facilitating the passage of substantial amounts of charge through the blade without requiring excessive rotational speed of the blade to accomplish a desired feed rate. For instance in a blade having a diameter of 18 inches, a pitch of 4 to 6 is appropriate, that is, the pitch of the blade approximates 0.10 to 0.30 times the diameter described by the blade (or the diameter of the conduit). Where the system includes more than one blade such as the arrangements in FIG. 4c and d, the pitch of each blade can coincide with that of the others and the blades can be at substantially the same elevation. The leading edge 47 and the trailing edge 49 are shown in FIG. 2 as substantially horizontal, i.e., normal to the vertical shaft 46, however, the practice of the invention contemplates arrangements where this aspect of the blade slopes downwardly to some extent although not a very great extent, so as to counteract the hydrostatic radial component of force of the scrap on the wall of the charging bay. Because of the downward divergence of conduit 40 the space 52 between the outer edge of the wedge or blade and the inner surface of the conduit 40 typically, and in most cases preferably, increases from the leading edge to the trailing edge as shown in FIG. 2 although the space 52 can be maintained at a constant level by providing a blade of steadily increasing radius from leading to the trailing edge. The space 52 should be such as to prevent any binding of feed material therein, where the feed is can stock. This distance is preferably ½ to 1 inch. A monotonically increasing space 52 from leading to trailing edge is preferred as minimizing binding or jamming.

The conduit 40 extends above and below the blade 44 as shown in FIG. 2 and it is important that the conduit 40 be downwardly diverging especially along that portion in which the blade 44 is situated. It is the open arc of the blade 44 in combination with this divergence which cooperate to prevent the clogging or jamming or bridging which have plagued previous mechanical charging arrangements when handling can scrap.

The divergence of the conduit 40 not only extends through the zone of the blade 44 but preferably extends substantially above and substantially below the blade 44 although such is not absolutely necessary. For instance, in FIG. 2 there is shown a short vertical portion having parallel walls at the bottom of the charge in which a portion of the compacted or downwardly pressed feed 50 is situated. Thus the invention contemplates in one embodiment that while the downwardly diverging portion of conduit 40 extends above and below the blade 44, there is a short height of parallel walls in the path seen by the charge as it is pressed and moved downwardly to the melting zone or chamber 32. Also, for purposes of this description the conduit is considered as extending all the way to the melting chamber since such is the conduit or path as seen by the charge. Also some upward divergence might be included above the blade to function as something of a hopper or funnel although there is some risk of introducing clogging thereby and these sections should not take on a dominant characteristic. The conduit typically diverges at an angle of about ½° to 5° from the vertical (1° to 10° included angle) with a divergence of 1° to 2°, to provide an included or enclosed angle of 2° to 4° having been found to be quite suitable. Larger angles of divergence may be useful although they can introduce some problem insofar as constricting the area above the blade 44 or enlarging it excessively below the blade. The conduit is described as substantially vertical but its axis can be a few degrees off the true vertical. It is preferred, however, that all sides diverge from a true vertical.

In operation, the feed scrap 18 is caused to fall by gravity through the tapered conduit 40 into the zone of the rotating blade 44. Because of the openings associated with the blade the feed readily passes through the zone of the blade and is compacted or downwardly pressed by the blade 44 into the mass 50 beneath the blade. The height or vertical dimension of the downwardly pressed mass 50, defined as the vertical distance between the trailing edge 49 of the blade 44 and the upper surface 31 of the liquid in melting chamber 32 is typically 4 to 8 inches. The depth for the downwardly pressed mass 50 can vary considerably in the practice of the invention. The choice depends largely on the amount of surging experienced in the molten metal since if substantial surges are encountered the molten metal can rise up to the blade area and possibly interfere with smooth operation. Hence it is advisable to provide some positive depth for the mass 50 to assure smooth operation, but this depth should not become excessive. The larger the depth for the mass 50 becomes, the greater the frictional forces between the mass 50 and the walls below the blade and this friction must be overcome by the downward force exerted by the blade on the mass 50. For instance in at least some embodiments, as the depth of the mass 50 approaches 8 inches, the frictional forces become quite substantial whereas a 4-inch depth is quite satisfactory. Hence the invention contemplates operating at depths of 1 or 2 inches up to 6 inches or even approaching 8 inches for the mass 50 with a goal of 2 to 4 inches being very satisfactory. As indicated earlier, the downwardly pressed mass 50 is depleted from its lower portions by the molten melting media sweeping through melting zone 32 but is continuously replenished from above by additional scrap or charge being pressed into the mass by the action of the blade 44.

The rotational speed of the blade 44, of course, determines the rate at which a given blade will press the mass 50 therebeneath and hence strongly influences the rate of immersion and melting. The rate of rotation can vary widely but should not be so high as to introduce vibratory motions to the compacted mass 50 of such character as to promote turbulence and skim formation. For instance, a suitable rpm range might be 50 to 200 rpm for a 180° blade of 18 inches diameter and a pitch of 4 inches. This provides for an approximate feed rate of 2,000 pounds per hour of a feed having a bulk density of 10 pounds per cubic foot.

The rate at which the feed 18 is discharged from the conveyor or transfer means 36 to the conduit 40 above the blade should be relatively constant and correlated with the blade rotational speed to minimize accumulation of feed charge above the blade. That is, while it is permissible to have a small amount of charge above the blade 44, it is preferable to provide as short a residence time above the blade as practical and very promptly urge the feed below the blade into the compacted or downwardly pressed mass 50 by the action of the rotating wedge of the blade 44. Thus the practice of the invention contemplates that the volumetric displacement of the blade at the chosen rotation speed and blade configuration should be safely greater than the volumetric feed rate discharged from the transfer means 36 to the conduit 40 above the blade. This provides some assurance of preventing an excessive build-up of charge above the blade 44 and of adequate downward force to immerse the charge into the melt. The volumetric displacement means the geometric volume theoretically displaced by the traveling wedge of the blade. The volumetric capability or displacement of the blade 44 is suitably 1 ½ to 50 times the actual rate of discharge from the transfer means 36 to the conduit 40. For instance with an actual charging rate of a little under 2,000 lbs. per hr. the theoretical charging rate of the blade 44 is suitably between 30,000 and 40,000 lbs. per hr. to provide a capacity ratio of 15 to 20:1. One of the basic reasons for the large safety factor is the varying bulk density of the scrap and charging rate. The bulk density and the submergence pressure of the charge pieces in effect drop off diring the free fall of the charge through the conduit and must be re-established and increased below the trailing edge of the blade 44.

As a principal concern often is to melt the feed as rapidly as possible utilizing the superheat or available heat in the melting media entering the melt chamber 32 through line 19, it is desirable that the melting chamber be so constructed and arranged with respect to the charging system 30 to apply as much of the available heat as effectively as possible to the charge mass 50 as it is urged downwardly and compacted by the action of the blade 44. The size of the chamber 32 beneath the mass 50 is not of great importance in itself but the size of the chamber should be such that, with reference to the charging rate, molten metal flow rate and amount of superheat in the molten metal media, a proper heat and temperature condition is maintained. In melting molten aluminum, and especially where the melting media is also aluminum, the molten stream exiting the melt chamber 32 through line 20 is preferably not below 1,300° F and should not go below 1,250°F in order to assure sufficient fluidity in the exit stream for proper transfer and to assure sufficient temperature to melt the incoming charge. The melting media moves through chamber 32 at a substantial rate to provide adequate heat transfer and melting rate although high turbulence is preferably avoided to minimize skim generation. In most instances a typical residence time for the molten media in the melt chamber 32 is 10 to 30 seconds with approximately 15 seconds being quite adequate. Thus the molten media within chamber 32 is considered as a moving body being continuously depleted and replenished.

Also it is preferable that the elevation of the line 19 entering the melting or charging bay 32 be positioned relatively high, as close ss practical to the desired interface 31 so as to direct the hottest possible metal to the lower portion of the compacted mass 50 but nonetheless below the interface surface 31 so as to avoid turbulence and the attendant skim generation. A distance of 2 inches below the interface is quite satisfactory. The discharge line 20 can be positioned relatively low since it is desired to remove coldest metal. The cross section of the melting chamber 32 in plan view preferably should be substantially commensurate with that of the discharge of conduit 40. If the melting chamber 32 were substantially smaller than the outlet of conduit 40, there would obviously be a build-up or at least a resistance to the movement of the compacted mass 50. If the melting chamber 32 were substantially larger than the discharge of conduit 40, scrap charge may stagnate in the annular zone outside the zone of influence beneath the blade 44. This could result in skim build-up and even freezing since a continuous mixture of particulate charge and incoming superheated melting media would not be provided in those annular spaces or zones. Hence the melting chamber 32 cross section as seen by the compacted mass 50 of charge is substantially commensurate with the discharge of the downwardly diverging conduit 40 by which is meant it is preferably within a few inches, say within 3 or 4 inches but is preferably of similar or substantially like cross section and similar or substantially like size in plan section. This assures proper rapid melting in that the charge is rapidly immersed or submerged in the moving superheated molten melting media whose heat energy is rapidly applied to the charge to achieve the desired high speed melting.

Molten media as used herein contemplates molten metal or other liquid suitable to supply heat to the charge and compatible therewith in a chemical sense so as to not degrade the charge. The media is superheated by which is meant it is at a temperature sufficiently above the melting temperature of the charge to rapidly melt the latter by transfer of sensible heat, that is, transfer of a portion or all of the superheat so as to not solidify the media. Where the charge is aluminum metal a highly suitable media is molten aluminum although molten salt also can serve the purpose. The salts referred to are the fluorides and chlorides of the alkaline and alkaline earth metals and more typically mixtures of these salts. Obviously the aluminum media has the advantage of high compatibility with the charge, very good heat conductance and simplicity of operation. The salt media on the other hand offers the possibility of less skim generation but requires separation from the melted charge which can be effected by gravity settling or centrifuging which constitutes added steps or operations in comparison with the procedure employing molten aluminum as the melting media. Also, reduced media thermal conductivity is experienced with salt, and heat transfer to the scrap must be largely by liquid convection of the media. Liquid convection is also required with aluminum media but is less limiting than with salt.

As far as materials of construction are concerned and referring to FIG. 2, the cone 40, shaft 46 and blade 44 can be fashioned from mild steel since they are not exposed to high temperature levels whereas the materials in contact with the molten aluminum such as the materials defining inlet 19, outlet 20 and melting zone 32 should be in a material which is substantially refractory to molten aluminum such as silicon carbide or any of the known refractory materials normally employed in handling aluminum.

The particular condition of the scrap is now discussed. Can scrap typically comprises bits and pieces of aluminum can material which can vary from rather small particles of 1/16 of an inch or so, up through elongated shred-like pieces, bent, crumpled or smashed portions of an aluminum can or, for that matter, an entire can smashed into a plate-like form or crumpled like a bent plate or a crumpled piece of paper. Many times the larger pieces are themselves pierced or broken in the handling or treatment of the cans as in delacquering where the cans are exposed to a volatile organic solvent or to hot gases and they are often punctured to aid in circulation of the solvent or gases through the bulk of the can scrap mass. It is this conglomeration of totally non-uniform sizes which tends to defy conventional mechanical delivery and immersion systems. Considering the case of a screw conveyor feeding vertically or horizontally into the charging unit, the entrance of the screw becomes rapidly bridged such that the screw portion of the conveyor is empty and the feed stacks up at the entrance to the screw. Other problems with respect to jamming and other effects also occur which further frustrate attempts to utilize mechanical systems with their inherent advantages over hydraulic systems as explained earlier.

The thickness of the sheet or stock can vary from about 3- or 4-thousandths of an inch up to about 20- or 30-thousandths for can stock, although thicknesses within the range of about 0.004 to about 0.020 inch are the most common. While can stock is one particular kind of feed to which the present invention is largely aimed, it is believed the present invention should find usefulness with other types of troublesome feed having similar characteristics, and therefore similar roots for these characteristics. Thus the invention should be suited to any type of feed comprising crushed sheet shapes including random sized shapes of sheet type products in various stages of tearing or smashing and typically comprising small platelet-like particles, shreds and other tear induced shapes or fragments, larger sheet shaped, typically jagged, punctured or otherwise torn or distorted and even larger, more complex shapes measuring several inches as derived from crushing an article such as a cup or drawn container shaped from a sheet or a larger crushed or distorted shape such as a portion of an automotive body panel which could be folded or severed in reclamation to produce the class of feed here under consideration. Thus, in a broad sense the invention should find application to any reclaimed sheet scrap feed derived from the reclaiming of sheet products, by which is meant the tearing, crumpling, crushing and the like types of operations commonly employed in reclaiming scrap for the products. The thickness obviously can vary over a wide range of from a few thousandths of an inch up to 1/8 of an inch or even more.

While the invention is particularly suited to the classes of feed just described, it its broadest sense it contemplates substantially any form of charge which is relatively, or more or less, flowable, having a typical size smaller than a 12-inch cube, but which will not sink by gravity when placed on the surface of the molten melting media. Also, mixtures of various types of charge pieces and particles can be simultaneously introduced to the improved system and rapidly melted in a smooth running relatively trouble-free operation. Further, since mixtures are contemplated there could be included in such a mixture some pieces capable of self-submergence and thus the contemplated charge comprises relatively flowable pieces in themselves capable of self-submergence in combination with other pieces which are not capable of self-submergence. Hence the invention contemplates feed mixtures comprising metal pieces ranging from relatively fine particles such as metal powders, pieces the size of metal shot, larger pieces such as parts of angles, channels or other structural shapes, pieces of castings or even entire castings, the sheet-derived scrap charge described above, and practically any character of charge admissible through the system. Obviously extremely large ingots such as continuously cast ingots may not be suitable for passage through the blade 44 unless it were made to approach gargantuan proportions. However those skilled in the art will have no difficulty understanding what type of charge is admissible through or passable through a given blade system as described herein. For instance considering a blade 16 inches in diameter having two blade sectors of 90° each spaced 180° apart, it is not difficult to envision how large a charge piece can be passed through such a blade. Obviously the introduction of the large pieces is not an important part of the invention but discussion thereof is brought forward simply to show that the improved system is capable of handling a very wide range of charge characteristics which thus enables its use on a wide scale rather than as a selective basis so as to render the improvement all the more attractive, especially in recycling aluminum or other metal scrap. That is, one need not go to different types of furnaces or charging systems with different types of charge but rather one can introduce a wide variety of charge into the improved system and be assured of a rapid melting process smoothly operable on a large scale or commercial basis. Hence the invention is described as useful on a charge which comprises a relatively flowable fraction incapable of self-submergence by gravity and it is believed that this explanation, especially in light of the foregoing elaboration, should leave no doubt in the minds of those skilled in the art as to the types of charge pieces contemplated by the invention.

Also, while the invention is described with particular reference to aluminum, its advantages should be useful with various metals including magnesium, brass, zinc, copper, and other metals or mixtures of metals.

As indicated in the foregoing description, the present improvement substantially reduces melt losses caused by oxidation and entrainment and is therefore highly useful in high speed melting systems, especially those involving a recirculating loop. A few illustrative comparisons will bring the matter into proper focus. In one case alloy 5182 containing nominally 4 ½ percent magnesium and 0.35 percent manganese was melted according to three different procedures. The feed was delacquered skeleton scrap which is the residual material resulting from punching out several discs from a sheet, the discs being punched out as close to one another as possible. In the first arrangement the charge was heated by direct firing in an open hearth furnace, and this resulted in 50 percent of the charge being lost to skim. In a second arrangement a recirculating loop melting system of the type depicted in FIG. 1 was employed. The molten metal was recirculated through the loop at a rate equal to 20 times the rate of scrap introduction. Scrap introduction was accomplished by a cascade wherein molten metal was caused to fall into a pool and the charge was introduced at that point in the pool so as to enable forced immersion by the action of the falling molten metal. This resulted in a melt loss of 20 percent. In a third arrangement the system shown in FIG. 2 in accordance with the improvement was employed, the arrangement being otherwise in accordance with the recirculating loop system just described for the cascade system. By using the present improvement the melt loss was cut to a mere 10 percent which, for alloy 5182 with its relatively high magnesium content, is considered a relatively low rate especially considering the high surface area of the charge.

In another comparison, alloy 3004 containing nominally 1.25 percent manganese and 1 percent magnesium, balance aluminum, was melted in two different arrangements. In the first, an open hearth was employed with a pool of molten metal therein and the scrap 3004 sheet was forcibly submerged by heavy charge pieces falling upon the scrap and rapidly submerging it. In this system, which is considered a good system from the standpoint of melt loss but cumbersome from the standpoint of operation, the melt loss to the skim was 6 percent. Employing the present improvement in a recirculating loop system cut this melt loss to a mere 1 ½ percent which is considered a very low melt loss and it has to be noted such is achieved without the need for heavy charge pieces which may not always be available.

In each of the foregoing illustrations the melt loss is that percent based on the initial weight of the charge which is lost to the skim either by entrainment or oxidation.

While the invention has been described in terms of preferred embodiments, the claims appended hereto are intended to encompass all embodiments which fall within the spirit of the invention.

Having thus described our invention and certain embodiments thereof, we claim:

1. A method of forcibly submerging a metal charge in molten melting media wherein said charge comprises pieces not capable of self-submergence said method comprising
   a. continuously introducing a supply of said charge into a conduit of substantially circular cross section having a downwardly diverging portion and discharging into a body of molten melting media;
   b. continuously urging said charge downwardly by the action of a rotating wedge blade situated in said diverging portion of said conduit, said wedge blade having an included arc describing a sector not substantially exceeding 360° and having at least one substantial opening therethrough such that said charge passes through said opening in said blade by gravity and is pressed downwardly by said blade into said molten melting media by the wedging action of said rotating wedge blade.

2. The method according to claim 1 wherein the metal charge comprises aluminum or aluminum alloys.

3. The method according to claim 1 wherein said charge comprises aluminous cans or can portions.

4. The method according to claim 2 wherein said melting media is molten aluminum.

5. The method according to claim 1 wherein said body of molten media is within a chamber of cross section commensurate with that of the outlet of said conduit and is continuously depleted and replenished with molten melting media to provide movement of said media within said chamber.

6. The method according to claim 1 wherein the melting media is supplied at a rate of 10 to 50 times the rate of the charge on a weight basis.

7. The method according to claim 1 wherein the walls of said conduit diverge at from ½° to 5° from the vertical.

8. The method according to claim 1 wherein said wedge blade has an included arc describing a sector less than 360° to provide said opening therethrough.

9. The method according to claim 8 wherein said wedge blade comprises one or more blade portions and the cumulative sector of said blades does not exceed a 180° arc.

10. The method according to claim 9 wherein said sector ranges from 160° to 200°.

11. The method according to claim 9 wherein said blade comprises two or more blade portions.

12. The method according to claim 1 wherein said blade has a pitch of from 0.1 to 0.3 times the blade diameter.

13. The method according to claim 1 wherein a gap is provided between said conduit and said blade said gap monotonically increasing downwardly along said blade.

14. The method according to claim 1 wherein said blade is rotated at a speed to provide a volumetric displacement of from about 1 ½ to about 50 times the volumetric rate of charge introduced to the blade.

15. The method according to claim 14 wherein said rotation is between 50 and 200 rpm.

16. The method according to claim 1 wherein said melting media is molten salt.

17. The method according to claim 5 wherein the average residence time of the molten media in said chamber is 10 to 30 seconds.

18. The improvement according to claim 1 wherein said conduit includes an upwardly diverging portion situated above said downwardly diverging portion.

19. In a method of melting a charge comprising aluminum can scrap wherein a melting media is recirculated by passing from a heating zone where it is heated to a charging zone where said charge is introduced to said melting media and back to said heating zone and a stream of molten aluminum is removed commensurate with the amount of said charge, the improvement wherein said charge is immersed in said molten media by the improvement comprising:
   a. continuously introducing a supply of said charge into a substantially vertical conduit of substantially circular cross section having a downwardly diverging portion and discharging into a moving body of molten media;
   b. urging said charge downwardly by the action of a rotating wedge blade situated in said diverging portion of said conduit said wedge blade having an included arc describing a sector less than 360° such that said charge passes through said blade to provide a body of said charge beneath said blade, said body being downwardly pressed and continuously urged into said molten media by the wedging action of said rotating wedge blade and being continuously replenished by further supply of said charge from above said blade.

20. In the method according to claim 18 wherein said molten media is aluminum or an alloy thereof.

21. In the method according to claim 18 wherein the volumetric displacement rate of said wedge blade is from about 1 ½ to about 50 times the volumetric rate of the supply of said charge.

22. In the method according to claim 20 wherein said body of molten media is within a chamber of cross section commensurate with that of the outlet of said conduit and is continuously depleted and replenished with molten melting media to provide movement of said media within said chamber.

23. In a method of melting a charge comprising aluminum can scrap wherein molten aluminum is recirculated by passing from a heating zone, where it is heated to a superheated condition, to a charging zone, where said charge is introduced to said molten aluminum, and back to said heating zone and a stream of molten aluminum is removed commensurate with the amount of said charge, the improvement wherein said charge is immersed in said molten aluminum by the improvement comprising:
   a. continuously introducing a supply of said charge into a substantially vertical conduit of substantially circular cross section having a downwardly diverging portion and discharging into a body of molten aluminum, having a cross section commensurate with that of the discharge of said conduit;

b. continuously urging said charge downwardly by the action of a rotating wedge blade situated in said diverging portion of said conduit and rotated at a rate to effect a volumetric displacement rate equivalent to about 1 ½ to about 50 times the volumetric charge rate said rotating wedge blade having an included arc describing a sector less than 360° such that said charge passes substantially by gravity through the zone of said blade to provide a body of said charge beneath said blade, said body being downwardly pressed and continuously urged and immersed into said molten aluminum by the wedging and pressing action of said rotating wedge blade and continuously replenished by further supply of said charge from above said blade;

c. continuously supplying superheated molten aluminum to said molten aluminum body beneath said conduit at a rate varying from 15 to 25 times said rate of charge introduction on a weight basis, said superheated aluminum melting said charge substantially as it is immersed thereinto;

d. continuously removing said molten aluminum and melted charge from said body.

24. In a method of melting a charge comprising metal pieces in a molten melting media wherein a portion of the metal pieces is incapable of self-submergence in said melting media, the improvement wherein said charge is forcibly immersed in said molten media by the improvement comprising:

a. introducing a supply of said charge into a substantially vertical conduit of substantially circular cross section having a downwardly diverging portion and discharging into a body of superheated molten media;

b. urging said charge downwardly by the action of a rotating wedge blade situated in said diverging portion of said conduit said wedge blade having an included arc describing a sector less than 360° such that said charge passes through said blade substantially by gravity and is pressed and urged downwardly into said molten media by the wedging action of said rotating wedge blade thereby to immerse said charge in said superheated melting media body to melt said submerged charge in said media;

c. continuously removing molten melting media and melted charge from said body;

d. continuously replenishing said body of molten melting media with superheated molten melting media.

* * * * *